United States Patent
Tucci

(10) Patent No.: US 6,685,125 B1
(45) Date of Patent: Feb. 3, 2004

(54) TOOL FOR REELING IN A TIP UP APPARATUS

(76) Inventor: James S. Tucci, 4286 Islandview Dr., Rhinelander, WI (US) 54504

( * ) Notice: Subject to any disclaimer, the term of this patent is extended or adjusted under 35 U.S.C. 154(b) by 0 days.

(21) Appl. No.: 10/185,687

(22) Filed: Jun. 28, 2002

(51) Int. Cl.[7] .................. B65H 75/30; A01K 89/015; A01K 97/12

(52) U.S. Cl. ............... 242/390.8; 242/394; 43/17; 43/17.5; 43/26.1

(58) Field of Search ............... 242/390.8, 390.9, 242/394, 225, 250; 43/17.5, 26.1, 17

(56) References Cited

U.S. PATENT DOCUMENTS

| | | | |
|---|---|---|---|
| 4,372,263 A | | 2/1983 | Costa |
| 4,567,686 A | * | 2/1986 | Akom ................ 43/17 |
| 4,887,777 A | | 12/1989 | Rasmussen |
| 4,962,901 A | | 10/1990 | Shirley et al. |
| 5,119,580 A | | 6/1992 | Schulte et al. |
| D416,267 S | | 11/1999 | Reilly |
| 6,015,111 A | | 1/2000 | Berke |
| 6,457,665 B1 | * | 10/2002 | Koehler et al. .......... 242/390.8 |

* cited by examiner

Primary Examiner—John M. Jillions

(57) ABSTRACT

A tool for reeling in a tip up apparatus for convenient and easy coiling of fishing line on the reel of a tip up apparatus. The tool for comprising a drive motor housed in a sealed enclosure with self-contained power supply and lighting device. A permanent non-replaceable chuck designed to engage with a tripping rotor as is generally used in tip up and fishing reel devices. The device includes controls for activating the motor and light. The enclosure is designed to comfortably fit the user's pocket or hand and the control device is designed so that a person wearing cold weather hand coverings could easily work the control while gripping the tool. The light is directed through a lens to illuminate the area that the chuck engages the trip rotor to provide the user with a well-illuminated area of work when engaging or disengaging the device from the tip up apparatus.

19 Claims, 4 Drawing Sheets

TOOL FOR REELING IN A TIP UP APPARATUS

BACKGROUND OF THE INVENTION

1. Field of the Invention

The present invention relates to ice fishing reel winders and more particularly pertains to a new tool for reeling in a tip up apparatus for added convenience for the user.

2. Description of the Prior Art

The use of ice fishing reel winders is known in the prior art. More specifically, ice fishing reel winders heretofore devised and utilized are known to consist basically of familiar, expected and obvious structural configurations, notwithstanding the myriad of designs encompassed by the crowded prior art, which have been developed for the fulfillment of countless objectives and requirements.

Known prior art includes U.S. Pat. No. 4,887,777, which teaches a tool for reeling the reel device of a tip up apparatus used for ice fishing which includes a hand grip, a retaining strap and lighting device but the structure defined in the claims would prohibit use with many tip up apparatuses and be generally hard to use with any tip up apparatus with the exception of the tip up apparatus it was designed to be used in conjunction with. The lighting device furthermore cannot focus on the trip rotor or the drive shaft when the device was in use. U.S. Pat. No. 4,962,901 teaches the use of a cordless screw driver as a mechanism for reeling fishing reels but the disclosure limits the device to attaching to a shaft mounted on the reel and not engaging the trip rotor and the cordless screwdriver would have a chuck that is replaceable and prone to loss.

While these devices fulfill their respective, particular objectives and requirements, the aforementioned patents do not disclose a new tool for reeling in a tip up apparatus. The inventive device includes a better-suited motorized drive device with integrated lighting means and a fixed chuck that would engage the trip rotor of a tip-up fishing apparatus. The drive motor device would be sealed to protect it from the wet and cold conditions as are experienced ice fishing. The sealed design would also render the device buoyant in water a feature beneficial, as it will be used near water where recovery of dropped devices is problematical.

In these respects, the tool for reeling in a tip up apparatus according to the present invention substantially departs from the conventional concepts and designs of the prior art, and in so doing provides an apparatus primarily developed for the purpose of providing a more practical and versatile tool for reeling a tip up apparatus for ice fishing.

SUMMARY OF THE INVENTION

In view of the foregoing disadvantages inherent in the known types of ice fishing reel winders now present in the prior art, the present invention provides a new tool for reeling in a tip up apparatus construction wherein the same can be utilized for added convenience.

The general purpose of the present invention, which will be described subsequently in greater detail, is to provide a new tool for reeling in a tip up apparatus and method which has many of the advantages of the ice fishing reel winders mentioned heretofore and many novel features that result in a new tool for reeling in a tip up apparatus which is not anticipated, rendered obvious, suggested, or even implied by any of the prior art ice fishing reel winders, either alone or in any combination thereof.

To attain this, the present invention generally comprises a drive motor housed in a sealed enclosure with self-contained power supply and lighting device. A permanent non-replaceable chuck designed to engage with a tripping rotor as is generally used in tip up and fishing reel apparatus is connected to the drive motor. The device includes a controls for activating the motor and/or the light. The enclosure is designed to comfortably fit the user's hand and the control devices are designed so that a person wearing cold weather hand coverings could easily work the controls. The light is directed through a lens to illuminate the area that the chuck engages the trip rotor to provide or other areas of ice fishing work.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tool for reeling in a tip up apparatus and method which has many of the advantages of the ice fishing reel winders mentioned heretofore and many novel features that result in a new tool for reeling in a tip up apparatus which is not anticipated, rendered obvious, suggested, or even implied by any of the prior art ice fishing reel winders, either alone or in any combination thereof.

It is another object of the present invention to provide a new tool for reeling in a tip up apparatus, which may be easily and efficiently manufactured and marketed.

It is a further object of the present invention to provide a new tool for reeling in a tip up apparatus, which is of a durable and reliable construction.

An even further object of the present invention is to provide a new tool for reeling in a tip up apparatus which is susceptible of a low cost of manufacture with regard to both materials and labor, and which accordingly is then susceptible of low prices of sale to the consuming public, thereby making such tool for reeling in a tip up apparatus economically available to the buying public.

Still yet another object of the present invention is to provide a new tool for reeling in a tip up apparatus, which provides in the apparatuses and methods of the prior art some of the advantages thereof, while simultaneously overcoming some of the disadvantages normally associated therewith.

Still another object of the present invention is to provide a new tool for reeling in a tip up apparatus for that improves upon the prior art by enabling a design that conforms to the size, shape and functionality more easily employed for it's use.

Yet another object of the present invention is to provide a new tool for reeling in a tip up apparatus, which includes a permanently fixed chuck, designed to engage a variety of sizes and types of trip rotors used in the art of fishing reeling devices.

Still yet another object of the present invention is to provide a new tool for reeling in a tip up apparatus that can coordinate the functions of reeling in a fishing line and lighting the user's area of work simultaneously.

Even still another object of the present invention is to provide a new tool for reeling in a tip up apparatus that is sealed against the elements present when ice fishing and to design the tool in such a manner that prevents loss by dropping or in the instance the tool is dropped allows the tool to be easily recoverable.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
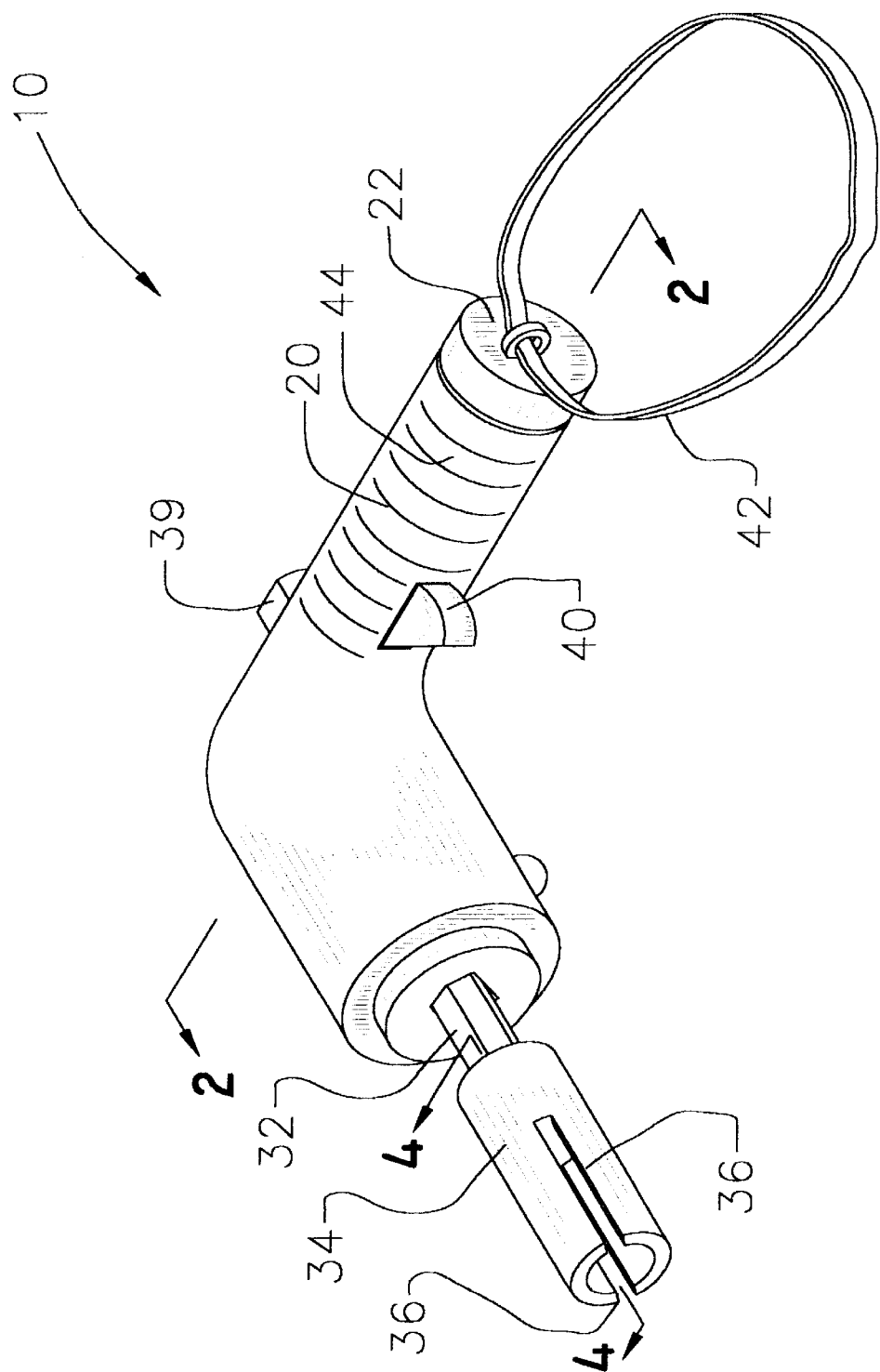
FIG. 1 is a perspective view of a new tool for reeling in a tip up apparatus according to the present invention.

With reference now to the drawings, and in particular to FIGS. 1 through 6 thereof, a new tool for reeling in a tip up apparatus embodying the principles and concepts of the present invention and generally designated by the reference numeral 10 will be described.

As best illustrated in FIGS. 1 through 4, the tool for reeling in a tip up apparatus 10 hereafter referred to, as the tool generally comprises a tool housing 20 that contains the internal components of the tool. The housing may be constructed with a variety of materials including metal, plastics, organic laminates, ceramics, etc. The housing would be rigid and non porous. The housing may be formed into a shape that fits the user's hand into the user's hand in the position of use. The illustrations depict a relatively cylindrical body that would define the gripping portion, and a second portion angled at approximately 90 degrees to the first portion, and possesses the trip rotor chuck 34, but the invention is not so limited. For example the body may have an relatively oval, ellipsoidal rectangular, etc. shape. The portion possessing the chuck may be parallel or included in the body portion. If separate from the body portion, the chuck could be positioned at any angle to the body to include an adjustable angle. The chuck section could be located in any part of the body. For example the chuck could protrude from the center of the body similar to a corkscrew and handle.

The exterior of the tool housing 20 might include a grip 44 to aid the user in gripping the tool 10. The grip may be comprised of a rubberized sleeve, non-skid pads, wound conformable material such as plastic, rubber or leather, etc. or comprise gripping deformations or texturing included in the material of the tool housing 20 itself. Because of the possibility of needing to access components in the interior of the tool housing 20 the tool housing 20 may include one or more access ports 22. The port could be used for maintaining, replacing or fixing the internal components. The access port 22 as illustrated in the drawing consists of a threaded screw on cap with appropriate seals to assure the integrity of the tool 10 although the invention is not so limited. For example the access port may comprise a doorplate similar to a camera, or a recessed pocket door or an expansion plate or the like. Many such sealed portal structures are known to those skilled in the art, and could be used in conjunction with the device without straying from the concept or spirit of the invention.

Figure 2:
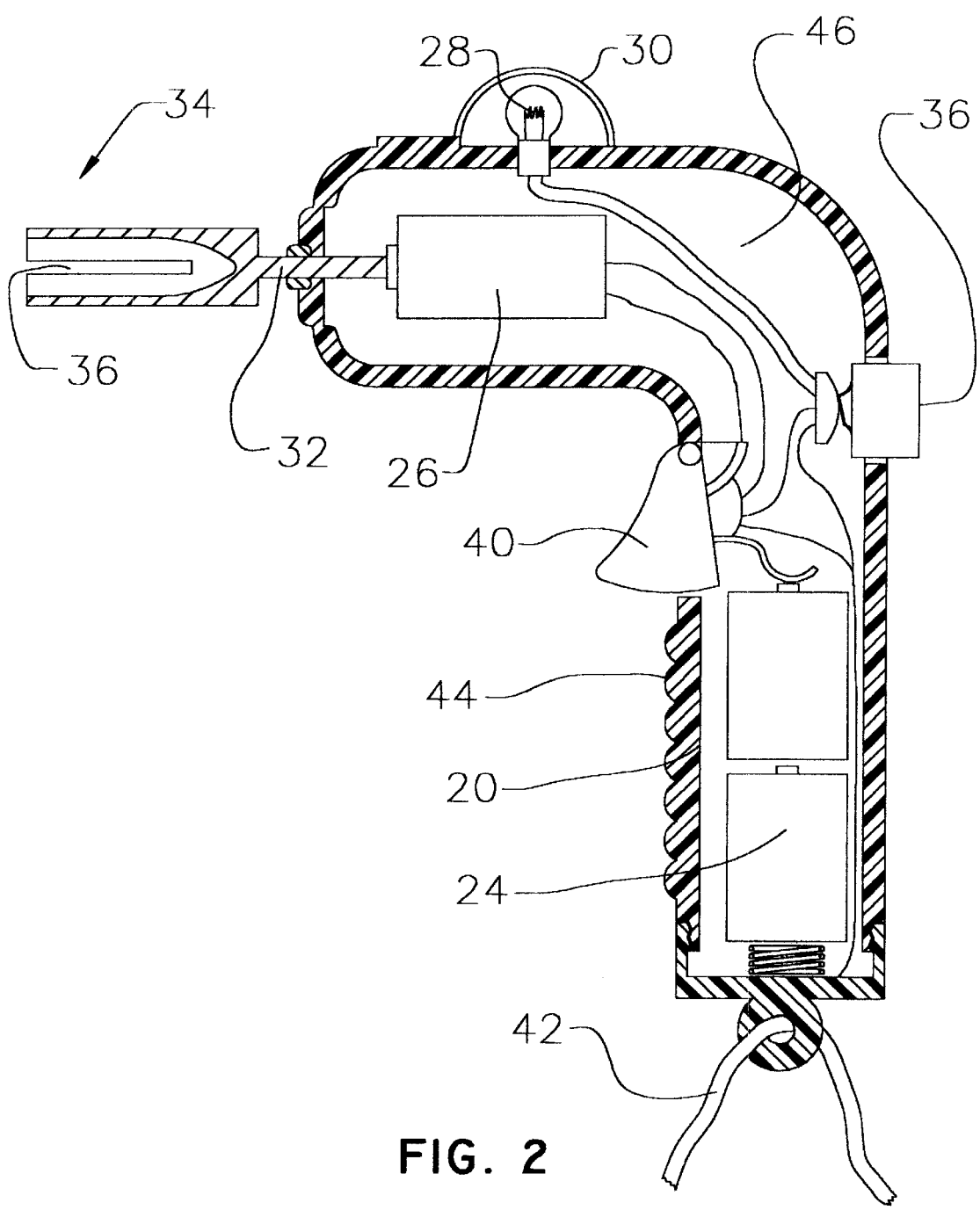
FIG. 2 is a cross section view of the present invention showing the placement of the internal components.

Contained within the tool housing 20 are the internal components, possibly including a self-contained power supply 24, which is depicted in FIG. 2 as batteries (such as replaceable or rechargeable batteries), but the invention is not so limited. Alternative power supplies may include hydrogen power cells, an array of capacitors, an ablative chemical reaction cell, etc. The power supply 24 is electrically coupled to the light source 28 and the drive motor 26 by way of the control devices 38 and 40.

Figure 3:
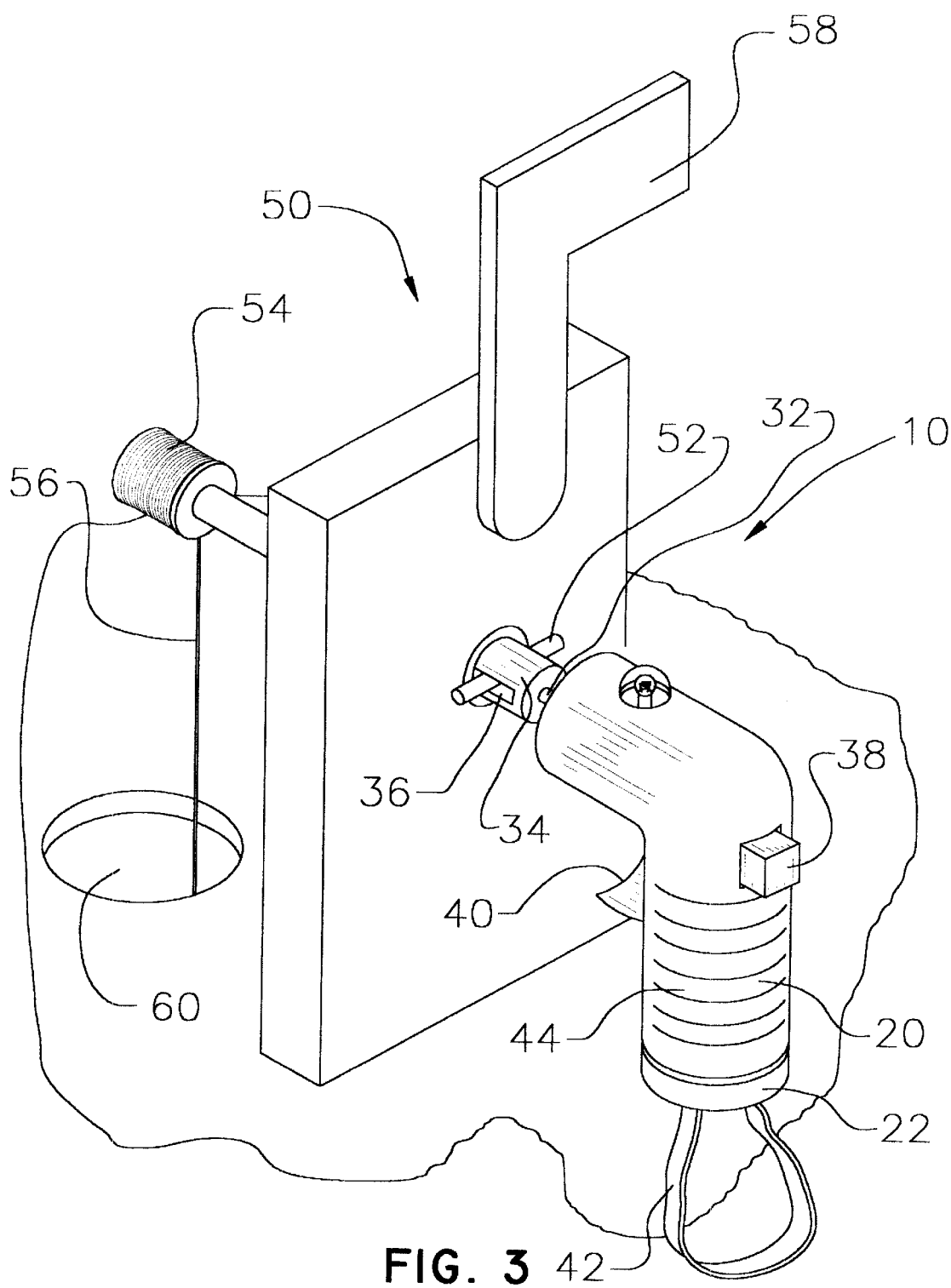
FIG. 3 is a perspective view of the present invention engaged with a tip up reel apparatus.
Figure 4:
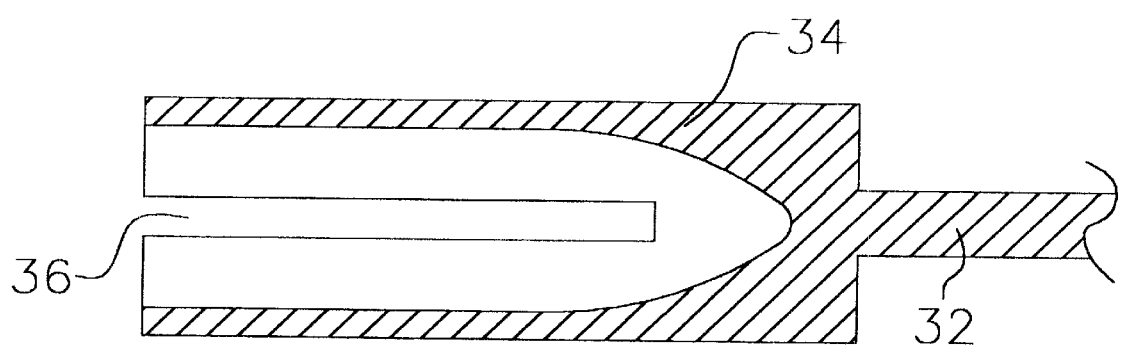
FIG. 4 is a cross section view of the chuck of the present invention.

The control devices 38 and 40 may comprise an actuator mounted in the tool housing 20 with sealing elements to insure a sealed integrity of the tool housing 20. The actuator may be coupled to an electrical switch to complete or interrupt a circuit between the power source 24 and light source 28 and/or drive motor 26. Alternately, the control device could include a dimmer switch to control the speed of the drive motor 26 or the intensity of the light source 28. In the case of the drive motor 26, the motor control 40 may include a polarity cross over to reverse the direction of the drive motor's 26 rotation. In FIG. 2 the motor control 40 is represented as a simple momentary switch that would drive the motor while the actuator was depressed, but the invention is not so limited. For example the switch may comprise a permanent switch with an on and off position or the control could comprise a rotary knob with a biased off setting and a range of motor speeds. The light control 38 in FIG. 3 is represented as a toggling permanent switch that would light the light source 28 by depressing once and the light would remain on without need for continued pressure on the switch and by depressing the switch a second time, the light source would turn off. The invention is not limited to this configuration, and includes the same range of alternatives referenced for the motor control 40.

The light source may comprise a light emitting element, such as an incandescent bulb, a single or an array of light emitting diodes, a florescent tube, etc. that would be electrically connected to the power supply 24 via the light control 38. The light source 28 may be connected to the interior of the tool housing so as to be able to provide illumination in the direction for which the tool 10 was designed. The light emitted from the light source 28 would pass through a light transmissive lens 30 that may aid in directing or focusing the light and may assist in the sealed integrity of the tool housing 20.

The drive motor 26 would also be electrically coupled to the power supply 24 via the motor control 40. The drive motor may also be firmly attached or anchored to the tool housing 20 to assure proper function of the drive motor 26 even under a heavy torque strain. The drive shaft 32 of the drive motor 26 may protrude from the tool housing 20 to be able to engage a trip rotor through the agency of the trip rotor chuck. The drive shaft 26 may protrude through the tool housing 20 at a point reinforced to withstand the rotation of the drive shaft 26 and that may facilitate the inclusion of sealing elements such as compression rings, "O" rings or sectionalized pressure conduits to assure the integrity of the tool housing 20. The drive shaft 32 would be fixedly connected to the trip rotor chuck 34, which is hereinafter referred to as the chuck 34. The chuck may be designed in a manner as to engage a variety of styles and sizes of trip rotors 52 used in reeling devices for fishing equipment. The chuck is generally defined as a rigid hollow cylinder bisected by a pair of slots 36 to receive the armatures of a trip rotor 52. By inserting the shaft of the trip rotor 52 in the central conduit of the chuck 34 and guiding the trip rotor armatures down their respective slots 36 the chuck 34 is able to engage the trip rotor 52 as to impart rotation from the drive motor 26 to the trip rotor and thus coil the reel. The slots 36 of the chuck 34 may incise the cylinder to a depth sufficient to engage the armatures of the trip rotor 52. The depth of the conduit of the cylinder of the chuck 34 should be deeper than the slots 36 to accommodate the hub, nut or shaft of the trip rotor 52. The interior of the cylinder may include a hemispherical or domed end to contact the end of the trip rotor shaft. This end may be beneficial in limiting the depth the trip rotor 52 enter the conduit.

The space within the sealed tool housing 20 unoccupied by the internal components may function to provide positive buoyancy to the tool 10. The tool may possess an amount of unoccupied space or buoyant cavities 46 as to allow the tool 10 to float in water.

Other accessories that may benefit the use or operation of the tool may include mounting accessories such as a strap 42, a belt clip, eyelets for attaching a strap 42, a hook for hanging the tool 10, mounting tabs or latches to attach the tool 10 to a mount or other device such as a charging stand for recharging rechargeable batteries, legs for standing the tool 10 in a fixed position, and the like.

In use, the tool 10 may be carried in the pocket of a user so it would be readily available when the fisherman or fisherwoman decides it is time to discontinue fishing, pick up his or her tip-ups, and go home. The tool 10 may then be easily drawn from the user's pocket, and due to it's ergonomic and intuitively manageable design, the user may effortlessly operate the tool even if the user was wearing heavy gloves or mittens. The tool housing with it's functional grip 44 would fit the user's hand and assure a non-slip hold. The controls 38 and 40 may be placed in locations on the tool housing 20 where the user could activate the light source 28 or drive motor 26 without releasing the grip on the tool 10. When the user actuated the light control 38, a connection between the power supply 24 and the light source 28 would be established. The light source 28 would emit light, which would be directed through the lens 30 to the area in which the tool 10 connects to the tip up apparatus 50, and more specifically, the connection between the chuck 34 and the trip rotor 52. By guiding the shaft of the trip rotor 52 down the central conduit of the chuck 34 and further steering the armatures of the trip rotor 52 into their respective slots 36, of the chuck 34, the chuck would be mechanically engaged with the trip rotor. The user would then actuate the motor control thus connecting the power supply 24 to the drive motor 26 and producing a rotation of the drive shaft 32 and chuck 34. Since the chuck 34 is mechanically connected to the trip rotor 52, it would rotate as well. The trip rotor 52 would communicate the rotation to the reel 54, which is mechanically coupled via a shaft, gears or other mechanical mechanism. The rotation of the reel 54 would coil the line 56 onto the reel 54 and out of the fishing hole 60. The motor control may then be released stopping the rotation of all the mechanical linkages described and the tool could be disengaged from the tip up apparatus and the light could be used to pack the tip-ups, such as, for example in a bucket. To prevent dropping or loss of the tool 10, a strap 42 is attached to the tool housing 20 that can be looped around the user's wrist or fingers. In the event of dropping the tool 10, the tool housing 20 and the internal components would be designed in such a manner to withstand the shock and vibration. If the user happened to drop the tool 10 in the fishing hole 60, the sealed design would insure that no water would infiltrate the tool housing 20 to damage any of the internal components. Further, due to the buoyancy imparted by sufficient unoccupied space or buoyant cavities within the tool housing the tool 10 would float at the top of the water allowing easy retrieval.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool for reeling a tip up apparatus, comprising:
 a chuck for engaging the trip rotor of said tip up apparatus, said chuck having a cylindrical main portion with a pair of opposing slots positioned through a perimeter wall of said main portion;
 a housing for containing the interior components of said tool, said housing being substantially L-shaped with a first extent and a second extent, said chuck being operationally couplable to said first extent, said second extent being adapted for being grasped by a human hand;

a control device for controlling interior components;

said interior components comprising:
- a self-contained power supply for providing power to said interior components;
- a light source for emitting light; and
- a drive motor for providing rotation to said chuck.

2. The tool of claim 1 wherein the chuck is permanently attached to the drive motor.

3. The tool of claim 1 wherein the chuck is able to engage a variety of trip rotors.

4. The tool of claim 1 wherein the housing is sealed against the infiltration of liquid.

5. The tool of claim 4 wherein the housing has sufficient buoyancy to float in water.

6. The tool of claim 1 wherein the housing includes a gripping surface.

7. The tool of claim 1 wherein the housing is of a size that renders the tool pocket portable.

8. The tool of claim 1 wherein the housing is ergonomically shaped to provide easy griping and operation of the controls.

9. The tool of claim 1 wherein the control device is located on the housing in locations that is accessible by a user when gripping the tool.

10. The tool of claim 1 wherein the control device includes a range of settings.

11. The tool of claim 10 wherein the range of settings defines motor speed.

12. The tool of claim 10 wherein the range of settings defines light intensity.

13. The tool of claim 1 wherein the power supply comprises a battery.

14. The tool of claim 1 wherein the light from the light source is directed through a lens.

15. The tool of claim 1 wherein the light is directed to the area of the chuck.

16. The tool of claim 1 wherein the drive motor is able to provide powered rotation in two directions.

17. The tool of claim 1 wherein the housing includes a securing device.

18. The tool of claim 17 wherein the securing device comprises a strap.

19. A tool for reeling a tip up apparatus, comprising;
- a chuck for engaging the trip rotor of said tip up apparatus comprising:
    - a rigid hollow cylinder;
    - a slot for engaging an armature of a trip rotor;
- a shaft connecting the chuck to the drive motor;
- a sealed housing for containing the interior components of said tool, said housing being substantially L-shaped with a first extent and a second extent, said chuck being operationally couplable to said first extent, said second extent being adapted for being grasped by a human hand;
- a control device for control of interior components;
- said interior components comprising:
    - a battery for providing power to said interior components;
    - a light source for emitting light through a lens of the housing; and
    - a multi directional drive motor for providing rotation to said chuck;
- wherein said control device controls activation of said interior components, intensity of illumination of said light source, speed of rotation of said drive motor, and direction of rotation of said drive motor.

* * * * *